Feb. 28, 1956

T. E. DOLAN ET AL
SYNCHRONIZING DEVICE FOR AIRCRAFT
FOLDING WING HYDRAULIC SYSTEMS 2,736,515

Filed Nov. 24, 1952

INVENTORS
Thomas E. Dolan
John B. Murray
BY
W. R. Robertson
Agent

Feb. 28. 1956     T. E. DOLAN ET AL     2,736,515
SYNCHRONIZING DEVICE FOR AIRCRAFT
FOLDING WING HYDRAULIC SYSTEMS
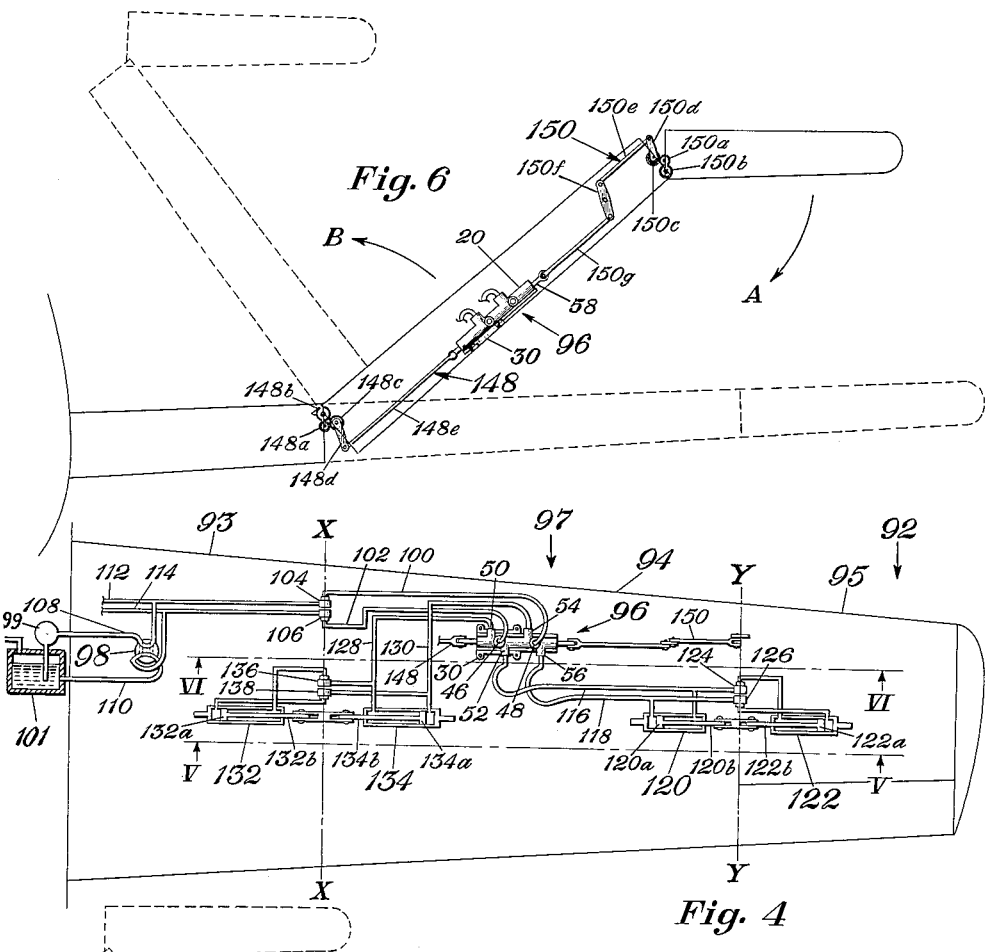
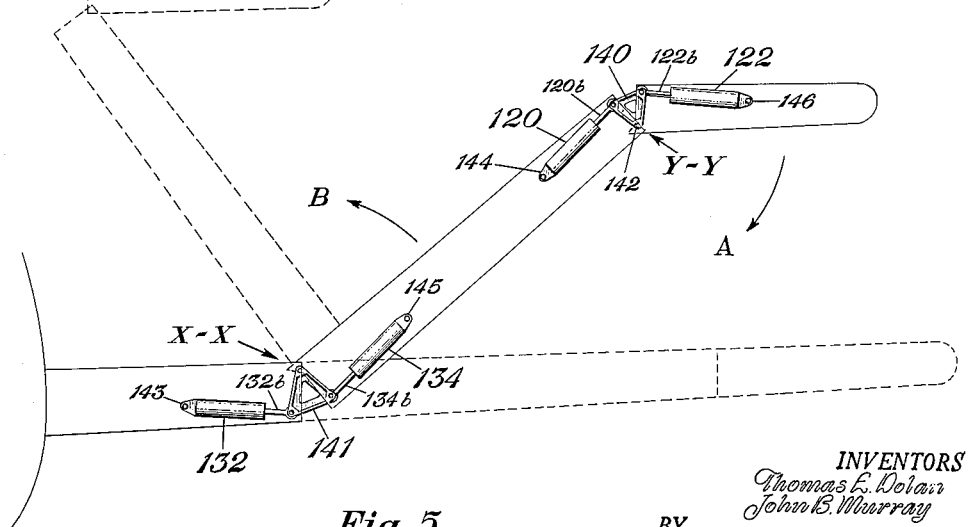
INVENTORS
Thomas E. Dolan
John B. Murray
BY
W. R. Robertson
Agent

United States Patent Office 2,736,515
Patented Feb. 28, 1956

2,736,515

SYNCHRONIZING DEVICE FOR AIRCRAFT FOLDING WING HYDRAULIC SYSTEMS

Thomas E. Dolan, Dallas, and John B. Murray, Arlington, Tex., assignors, by mesne assignments, to Chance Vought Aircraft, Incorporated, a corporation of Delaware Application November 24, 1952, Serial No. 322,281

2 Claims. (Cl. 244—49)

This invention is a device for coordinating the actions of two separate mechanisms each actuated by a hydraulic prime mover both receiving pressure flow from a common source and having a common reservoir, or return circuit. It is related in particular to airplane mechanisms hydraulically actuated.

In the design of modern aircraft, the need has existed for providing a control means whereby two independent hydraulic motors are synchronized with each other so that the mechanisms they actuate progress in a predetermined relationship to each other. Usually this requirement is that the two advance with equal velocities.

For example, it is very desirable that the two wing flaps of an airplane extend or retract simultaneously. If either flap actuates later than the other, considerable yawing forces are exerted on the airplane because of the unequal slipstream resistance.

In another case having similar requirements, an airplane wing design incorporates a folding tip, which, during flight, folds from a horizontal position, where it serves as part of the wing, up to a vertical position where it then acts as a vertical stabilizer. It is important that the two wing tips, one on either wing, fold up simultaneously, or extend to again become part of the wing, simultaneously. Otherwise, unequal lifting forces between the right and left wing panels will tend to roll the airplane.

It is therefore an object of this invention to provide a control means to coordinate the actions of two separate hydraulically actuated mechanisms.

It is also an object of this invention to provide hydraulic valve means for distributing hydraulic pressure flow to two separate hydraulic motors the control of which valve means is a composite and concurrent function of the two resulting motor actuations, and which control correlates the two actuations with each other so that they progress in a predetermined relationship.

It is a further object of this invention to provide a hydraulic flow distribution means which takes the hydraulic flow from a single head, or pressure source, and divides, proportions and directs it into two separate currents having a predetermined ratio therebetween. The supervision of said distribution means is a direct function of each and both of the two currents so that said supervision therefore regulates said proportioning to maintain said ratio.

Yet another object of this invention is to provide a hydraulic valve of the piston type with mounting means so that the valve housing is longitudinally slidable within and upon said mounting means, and slidable independently of the valve piston.

The term hydraulic motors as used herein is intended in the broad sense to include rotary motors, linear actuators and all other devices converting hydraulic flow into mechanical motion.

In the embodiment described herein the valve of this invention is used to synchronize the folding (or extending) of the wings of an airplane. Each wing panel has two folds; one hydraulic valve means of this invention is used to coordinate the two folds of one panel, and another like valve means is used to coordinate the two fold motions of the other panel (not shown).

The valve system which is this invention receives hydraulic pressure flow from a pressure source and divides it into two currents. The two currents are routed to hydraulic motors and the return flow therefrom also passes through this valve. The flow of hydraulic fluid through this valve is governed by the relative position of the valve piston to the valve housing. The positions of these parts are controlled by linkages connected to the bodies moved by the motors to effect a restriction of hydraulic flow to either motor if one motor gains ahead of the other until the lagging motor, its flow unrestricted, can come abreast. Then restriction is removed. No restriction occurs as long as the two motors proceed in predetermined relationship.

In the drawings:

Fig. 4 is a true plan view of the right wing panel of an airplane showing the hydraulic fold circuit and its components including the valve of this invention;

Fig. 5 is a sectional view taken at V—V in Fig. 4 showing the linear actuators which effect the folding and showing the wing in the process of being folded; and Fig. 6 is a sectional view taken at VI—VI in Fig. 4 showing the valve and the fold linkage which controls it and showing the wing in the process of being folded.

Figure 1:
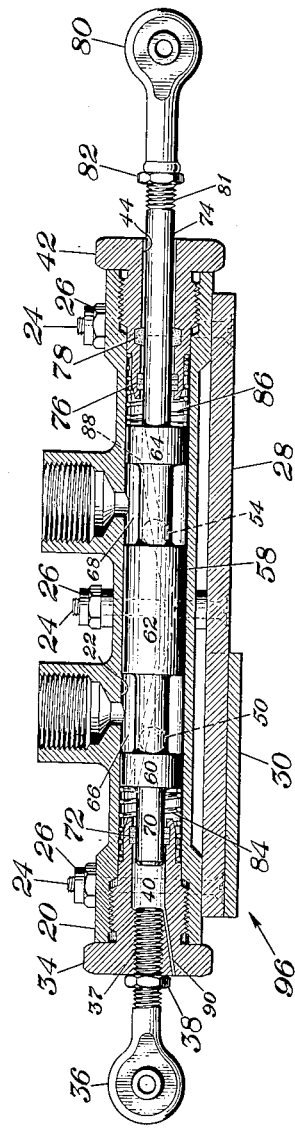
Fig. 1 is a side elevation view, partly sectional, of the valve of this invention.
Figure 3:
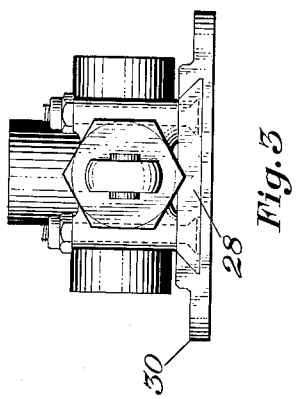
Fig. 3 is an end view of the valve.

Referring first to Fig. 1, a valve housing 20, provided with bore 22, is fixedly attached by six bolts each numbered 24 and six nuts each numbered 26 to a carriage 28, itself slidably supported in a mounting base 30. As can be seen in Fig. 3, a dovetail mount is provided to permit relative sliding movement between the carriage and the base. The six surfaces of contact in the dovetail mount are machined to a fine finish and supplied with a suitable lubricant so that the housing and carriage assembly may slide easily upon the base between the limits of motion, which limits are generally the respective ends of carriage 28. Base 30 is provided with four lugs each numbered 32, each having a bolt-receiving hole therein so that base 30 may be fixedly attached to a supporting structure.

Figure 2:
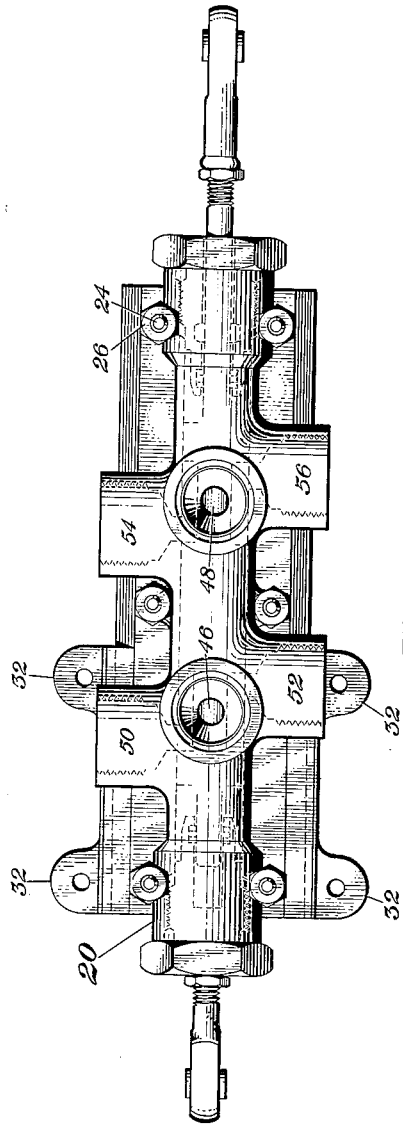
Fig. 2 is a plan view of the valve of Fig. 1.

One end of housing 20 is enclosed by an end plug 34 screw-threaded therein and end plug 34 is provided with a rod end 36 adjustably attached thereto by means of screw threads 37 and jam nut 38. The inner end of plug 34 is provided with a bored recess 40. The other end of housing 20 is enclosed by end plug 42 screw-threaded therein and which is provided with bore 44. Referring to Fig. 2, housing 20 is seen to be provided with six fluid ports 46, 48, 50, 52, 54 and 56, each of which is provided with an internally threaded boss for connecting fluid conduits thereto. A piston 58 has a mid-portion comprising three lands 60, 62 and 64 and two grooves, 66 and 68. A projection 70 of piston 58 slides in recess 40 of plug 34 and packing 72 effects a fluid tight seal therebetween. A piston stem 74 extends through bore 44 of plug 42 having a sliding fit therewith. Packings 76 and 78 effect a fluid tight seal between the stem 74 and the bore 44. A rod end 80 is adjustably attached to stem 74 by means of screw threads 81 and jam nut 82. Piston 58 is freely slidable longitudinally in housing bore 22 and is shown in Figs. 1 and 2 in its neutral position, which neutral position is hereinafter specifically defined. Compression spring 84, positioned between the outer end of land 60 and a shoulder on plug 34, and compression spring 86, positioned between the outer end of land 64 and a shoulder on plug 42, urge the piston to assume this neutral position for facilitating the installation and rigging of the valve. Oil passage 88 in the piston provides communication between the two chambers which house springs 84 and 86 to permit free reciprocal movement of the idle oil trapped within the spring chambers so that piston 58 will not be restricted in its sliding by the idle oil. Also, breather passage 90 in end plug 34 permits the free movement of air between the bored recess 40 and the atmosphere so that the piston is not hampered in its operation by having to compress air (or draw a partial vacuum) in the recess.

In Fig. 4, the right wing panel 92 of an airplane is shown as comprising three sections 93, 94, and 95. As will be seen in Figs. 5 and 6 the panel is designed to fold from an extended, or flight, position to a double folded position for stowage. The limits of fold are shown in phantom outline. The outer section 95 rotates relative to intermediate section 94 about fold axis Y—Y. The assembly comprising sections 94 and 95, hereinafter referred to as assembly 97, rotates relative to section 93 about fold axis X—X.

Numeral 96 designates the valve assembly of Figs. 1 and 2, which assembly is shown in plan view in Fig. 4. The base 30 of the valve 96 is fixedly attached to structure in the intermediate wing section 94 by bolting lugs 32 thereto. The pressure ports 48 and 46 of valve 96 are connected to a selector valve 98 by conduits 100 and 102, respectively, which selectively convey pressure flow and return flow, as the case may be, and which include conventional type hydraulic conduit swivel joints 104 and 106, respectively at the fold axis X—X. Selector valve 98 is connected to the airplane's hydraulic pressure system 99 by conduit 108 and to the system reservoir 101 by return conduit 110. Conduits 112 and 114 convey pressure flow and return flow selectively, from selector valve 98 as the case may be, to the corresponding synchronization valve in the airplane left wing panel (not shown). Conduits 116 and 118 lead from ports 52 and 56 respectively, of synchronization valve 96 and convey pressure flow and return flow selectively, as the case may be, to double-acting hydraulic actuators or motors 120 and 122 acting as prime movers, the conduits to actuator 122 including conventional type swivel joints 124 and 126 at the fold axis Y—Y. Similarly, conduits 128 and 130 lead from ports 50 and 54 respectively of valve 96 and convey pressure flow and return flow selectively, as the case may be, to double-acting motors or actuators 132 and 134, the conduits to actuator 132 including conventional type swivel joints 136 and 138 at the fold axis X—X. The several swivel joints 104, 106, 124, 126, 136 and 138 are employed to permit the hydraulic conduits to operably cross the wing fold axes X—X or Y—Y, the swivel joints 104, 106, 124, 126, 136 and 138 in this instance are so disposed that their swivel axes are coincident with the respective fold axes.

For the purpose of explaining first the course of the hydraulic circuit, let it be assumed that it is desired to fold the wing panel from its flight position. Selector valve 98 would be turned to a position where (as shown) hydraulic pressure flow from system pressure conduit 108 is directed into conduits 100 and 112, which selector valve position simultaneously connects conduits 102 and 114 to conduit 110 which leads to the hydraulic system reservoir. The system pressure flow is thus directed by selector valve 98 into conduit 100, which conveys the flow to port 48 of valve 96, there dividing through valve ports 56 and 54 into conduits 118 and 130, which two conduits carry the flow into the cylinders of each of the four actuating motors 120, 122, 132 and 134 where it exerts pressure against the full face of pistons 120a, 122a, 132a and 134a to extend piston rods 120b, 122b, 132b and 134b out of the cylinders of motors 120, 122, 132 and 134 respectively. Reference now to Fig. 5 will show how a not uncommon type of bellcrank linkage is employed at each hinge axis in connection with the actuating motors to accomplish the desired folding action. The piston rods 120b and 122b of actuators 120 and 122 respectively are attached to the ends of the diverging segments of bellcrank 140 and push against each other through the idler bellcrank 140 one corner of which is pivotally attached to the wing structure at 142 so that the bellcrank 140 pivots about a center coincident with the fold axis Y—Y. The actuators are pivotally attached at 144 and 146, respectively, to the wing structure. Similarly, actuators 132 and 134 are linked together through bellcrank 141 which rotates about X—X, themselves pivotally attached to the wing structure at 143 and 145. An analysis of the geometry of the mechanism will disclose that, as pressure flow is directed into the cylinders of motors 120, 122, 132 and 134 through conduits 118 and 130 whereby the piston rods 120b, 122b, 132b and 134b are extended out of their respective cylinders, section 95 will rotate clockwise about axis Y—Y as shown by arrow A in Fig. 5 and assembly 97 will rotate counterclockwise about axis X—X as shown by arrow B.

If it is desired to extend the wing from folded to flight position, selector valve 98 is rotated ninety degrees from the position shown in Fig. 4 thus connecting system pressure conduit 108 to lines 102 and 114, and connecting the system reservoir to lines 100 and 112. Hydraulic flow to the cylinders is thus reversed wherein pressure flow is conveyed through conduits 116 and 128 into the opposite ends of the actuators 120, 122, 132 and 134, exerting its pressure against the piston rod faces of pistons 120a, 122a, 132a and 134a and their actuation now drives the wing sections to their extended position. To understand the need for coordinating the folding (or the extending) of section 95 about Y—Y with the folding (or the extending) of the assembly 97 about X—X reference may be had to Figs. 5 and 6. It is evident that the action of actuators 120 and 122 during folding will not be one of doing work, but rather one of retardation, since gravity will tend to bring wing section 95 down. However, actuators 132 and 134 will be doing work during wing folding, but not during the entire folding. For that portion of travel of the assembly 97 when the center of gravity of the assembly is beyond a vertical position gravity will be pulling it also into folded position. A converse condition will exist when the wing panel is extended from folded to flight position in that the requirements of work and retardation will be reversed. Therefore, if no synchronization means were employed, an unequal progression of the two sets of actuators would result because of the unequal and changing reactions against which the cylinders work. To attempt to fold the wings without some sort of synchronization means would result in the tendency of section 95 to fold faster than the assembly 97 and to strike the hangar floor, or carrier deck. Or, if the wing were extended, gravity would tend to hasten the rotation of assembly 97 about X—X, again making section 95 liable to strike the deck. In an effort to obtain satisfactory action by other methods, for example by the use of conventional flow restrictors, the use of these alone in the hydraulic lines would provide some control, but at best such control would be largely erratic and unreliable because the load on the actuators changes constantly in both value and sign. Also, if a wind is blowing, reaction against the actuators is even more variable. Therefore, the need for a positive synchronization means is apparent.

It will now be explained exactly how the valve of this invention accomplishes the desired synchronization.

Referring again to Fig. 1, it is seen that ports 50, 52, 54 and 56 are each so disposed, and the grooves and lands of the piston are so proportioned and disposed, that (a) for the one piston position shown (relative to the housing) no port is restricted by any land (this one piston position relative to the housing is referred to herein as the piston's neutral position) but (b) for any displacement of the piston from this neutral position in either direction, a restriction of flow is obtained. For example, if the piston slides to the left from neutral, ports 52 and 56 will be restricted by lands 62 and 64 respectively, but ports 50 and 54 will not be affected. But if the piston slides to the right from neutral then ports 50 and 54 are restricted by lands 60 and 62 respectively, but not ports 52 and 56. Referring now again to Fig. 6, the valve housing 20 is shown as reciprocally operable on base 30 by the gear and push-pull linkage 148.

As the assembly 97 rotates, say counterclockwise as indicated by arrow B, gear 148a, which is pivotally attached to wing section 94, is caused to rotate about its center since it meshes with gear 148b which is fixedly attached to wing section 93. Therefore gear 148c, since it meshes with gear 148a, and is also pivotally attached to wing section 94, will be rotated about its center. An arm 148d is integral with gear 148c and has an operable connection to a rod 148e, the other end of which is operably connected to rod end 36 of valve housing 20. When assembly 97 is rotated counterclockwise about axis X—X, arm 148d, when moved by gear 148c will pull rod 148e and housing 20 to the left toward X—X. If the assembly 97 is rotated clockwise about X—X, then housing 20 will slide to the right, away from X—X. Similarly, another gear and push-pull linkage 150 comprising gears 150a, 150b and 150c, arm 150d, rod 150e, idler beam 150f and rod 150g, will cause the valve piston 58 to slide longitudinally relative to base 30. In this gear and linkage assembly 150, the gear 150a is pivotally attached to wing section 94 and meshes with gear 150b which is fixedly attached to wing section 95, and in turn meshes with gear 150c which is pivotally mounted on section 94 and which has an integral arm 150d, the end of which has an operable connection with one end of rod 150e. The other end of rod 150e is pivotally attached to the end of idler beam 150f, the opposite end of idler beam 150f being pivotally connected to one end of rod 150g, which has its other end pivotally connected to rod end 80 of valve piston 58. As wing section 95 folds in a clockwise direction about Y—Y the piston moves toward X—X. As wing section 95 extends, or rotates in a counter-clockwise direction about axis Y—Y, the piston moves to the right away from X—X. The linkages 148 and 150 are so proportioned and dimensioned that as long as the two angular velocities of rotation about axes X—X and Y—Y remain equal the housing's linear velocity sliding along the base 30 will be equal to and in the same direction as the piston's linear velocity. And since both housing and piston move in the same direction simultaneously, toward X—X during wing folding (or away from X—X during wing extending), the piston will therefore retain its position of neutral relative to the housing. But if either action, that about axis X—X or that about axis Y—Y, gains ahead of the other, the piston then moves faster, or slower, than the housing, as the case may be, thus restricting both pressure flow and return flow to and from the leading motors and slowing them down thereby permitting the lagging action to come abreast of the leading action. For example, using the situation of folding illustrated in Figs. 5 and 6, let it be supposed that section 95 under the force of gravity begins to move about axis Y—Y with greater angular velocity than that of assembly 97 about axis X—X. This difference between the two angular velocities results in different linear velocities of the housing and the piston, the piston moving faster to the left toward X—X than the housing, and therefore away from neutral to restrict ports 52 and 56, which can be verified in detail by referring again to Fig. 1. Referring now again to Fig. 4 it will be seen that the restricted port 56 will then provide motors 120 and 122 with less pressure flow thus slowing down the folding about axis Y—Y. But the folding about axis X—X is not retarded because port 54, which is presently supplying pressure flow to motors 132 and 134, is not restricted. If the flow were in the opposite direction, that is, the wing being extended, and section 95 moving faster (using the same example) than assembly 97, then restricted ports 52 and 56 would be restricting the circuit flow to and from cylinders 120 and 122, thus slowing down the rotation about axis Y—Y. It should be pointed out that it is important that restriction of the flow must be effected on the return circuit during any portion of motor or actuator travel when gravity or other exterior forces such as wind completely removes the load on said motors and makes their action one of retardation rather than one of work. This is because the exterior loading, if permitted, will create a partial vacuum in the actuator cylinders of the motors and cause cavitation of the fluid. The valve of this invention, by restricting the flow both to and from the motors a like amount, accomplishes the desired restriction whether the loading is positive or negative.

It has been shown how the two folding actions of each section of double-fold wing panels can be coordinated by the synchronizing device of this invention. It would also be possible to use the device of this invention, were it necessary, to coordinate the two sections to act together. In the case of coordinating the wing flaps of an airplane, push-pull linkage similar to that of this embodiment could be utilized. For synchronizing folding wing tips, it would not be difficult for those skilled in the art to provide a cable control for operating the housing and piston of this valve. It can easily be seen that the synchronizing device of this invention can be used equally as well for synchronizing the movement of any two hydraulic prime movers through suitable linkages associated with the movers and connected to the valve housing and valve stem for the particular application.

While only one embodiment of the invention has been shown in the accompanying drawings, it will be evident that various modifications are possible in the arrangement and construction of the components without departing from the scope of the invention.

We claim:

1. In an aircraft wing fold system, an articulated wing panel having two sections which fold, each of which has a pivoted connection to the next adjacent wing section; a source of fluid under pressure; a pair of hydraulic struts for folding each section located one on each side of the wing section fold and pivot axis and having opposed piston rods; and mechanism for synchronizing the folding of said sections comprising, a valve including a base fixedly mounted on aircraft wing structure, a valve housing slidable on said base and having ports having fluid connection with said pressure source and said hydraulic struts, and a valve rod slidable within said housing and having lands for directing the flow of fluid from said source selectively to said ports, linkage associated with one of said wing fold pivot connections and having an operable connection with said housing; and linkage associated with the other of said wing fold pivot connections and having an operable connection with said valve rod, the relative positions of said housing and said valve rod being positioned by said linkage to control the flow of fluid through said ports to said hydraulic struts by positioning of said lands in relation to said ports.

2. In an aircraft wing fold system, an articulated panel having a stationary section and two sections which fold at respective fold axes, a bellcrank having a pivotal connection to the wing on each of said fold axes, hydraulic actuating means for folding said wing folding sections including a hydraulic strut on either side of each of said fold axes, said struts being connected in opposed relationship to a free end of said bellcranks, a source of pressure fluid, a valve housing slidable within a fixed base and having a slidable valve therein and having fluid connections with said pressure source and said actuating means, and governing means for said valve including an arm pivotally mounted on one of said folding sections adjacent each of said fold axes and pivotally actuated by movements of said folding sections, and linkage means between the end of one arm and said valve and between the end of the other arm and said valve housing whereby relative positioning of said valve in said valve housing is controlled by the folding of said folding sections to govern the flow of pressure fluid through said fluid connections to said actuating means when said wing sections are moved about their fold axes by said actuating means.

References Cited in the file of this patent

UNITED STATES PATENTS

| | | |
|---|---|---|
| 1,258,337 | Imblum | Mar. 5, 1918 |
| 1,391,676 | Finley | Sept. 27, 1921 |
| 2,166,564 | Atwood et al. | July 18, 1939 |
| 2,380,973 | Kapp | Aug. 7, 1945 |
| 2,460,774 | Trautman | Feb. 1, 1949 |
| 2,508,647 | Newman et al. | May 23, 1950 |
| 2,670,910 | Hill | Mar. 2, 1954 |

FOREIGN PATENTS

| | | |
|---|---|---|
| 686,646 | Great Britain | Jan. 28, 1953 |

OTHER REFERENCES

Ser. No. 323,201, Dewoitine (A. P. C.), published May 25, 1943.